United States Patent
Yuan et al.

(10) Patent No.: US 11,646,970 B2
(45) Date of Patent: May 9, 2023

(54) METHOD AND APPARATUS FOR DETERMINING PACKET DEQUEUE RATE

(71) Applicant: Huawei Technologies Co., Ltd., Shenzhen (CN)

(72) Inventors: Sai Yuan, Beijing (CN); Xiaozhong Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/171,250

(22) Filed: Feb. 9, 2021

(65) Prior Publication Data

US 2021/0176182 A1 Jun. 10, 2021

Related U.S. Application Data

(63) Continuation of application No. PCT/CN2019/097035, filed on Jul. 22, 2019.

(30) Foreign Application Priority Data

Aug. 9, 2018 (CN) .......................... 201810903782.8

(51) Int. Cl.
*H04L 47/25* (2022.01)
*H04L 43/08* (2022.01)
(Continued)

(52) U.S. Cl.
CPC .............. *H04L 47/25* (2013.01); *H04L 43/08* (2013.01); *H04L 43/16* (2013.01); *H04L 47/28* (2013.01);
(Continued)

(58) Field of Classification Search
CPC ......... H04L 47/25; H04L 43/08; H04L 43/16; H04L 47/28; H04L 47/29
See application file for complete search history.

(56) References Cited

U.S. PATENT DOCUMENTS 9,063,841 B1 * 6/2015 Valency ................. G06F 12/023
9,246,829 B2 1/2016 Pan et al.
(Continued)

FOREIGN PATENT DOCUMENTS

| CN | 101834782 A | 9/2010 |
| CN | 105978821 A | 9/2016 |
| CN | 106954101 A | 7/2017 |

OTHER PUBLICATIONS

Yu, P., et al., "Load Adaptive Dynamic Mapping for video streaming over IEEE 802.11e network," 2013 International Conference on Wireless Communications and Signal Processing, Date of Conference: Oct. 24-26, 2013, Date Added to IEEE Xplore: Dec. 2, 2013, 6 pages.

(Continued)

*Primary Examiner* — Siming Liu
(74) *Attorney, Agent, or Firm* — Conley Rose, P.C.

(57) ABSTRACT

A method for determining a packet dequeue rate includes allocating a plurality of consecutive blocks in a first memory to a first packet, storing the first packet and a first length in the plurality of blocks, where the first length is of a first packet queue and is obtained when the first packet is enqueued into the first packet queue, and determining, based on a first span and the first length stored, a first rate at which a packet in the first packet queue is dequeued, where the first span is equal to a difference between a second time and a first time, the first time is when the first packet is enqueued into the first packet queue, and the second time is when the first packet is dequeued from the first packet queue.

20 Claims, 4 Drawing Sheets

(51) Int. Cl.
  *H04L 43/16*    (2022.01)
  *H04L 47/28*    (2022.01)
  *H04L 47/10*    (2022.01)
  *H04L 47/32*    (2022.01)
  *H04L 49/9005*  (2022.01)

(52) U.S. Cl.
  CPC .............. *H04L 47/29* (2013.01); *H04L 47/32* (2013.01); *H04L 49/9005* (2013.01)

(56) References Cited

U.S. PATENT DOCUMENTS

| | | | |
|---|---|---|---|
| 9,674,104 B1* | 6/2017 | Pan | H04L 47/283 |
| 2003/0074486 A1* | 4/2003 | Anastasiadis | H04L 67/1097 |
| | | | 719/321 |
| 2005/0195857 A1* | 9/2005 | Tsai | H04N 21/4343 |
| | | | 370/470 |
| 2010/0232446 A1 | 9/2010 | Ma et al. | |
| 2015/0127911 A1* | 5/2015 | Steiss | G06F 12/1045 |
| | | | 711/123 |
| 2016/0212070 A1 | 7/2016 | Chang | |

OTHER PUBLICATIONS

White, G., "Active Queue Management in Docsis 3.X Cable Modems," Network Technologies, Cable Television Laboratories, Inc., 2014, May 2014, 36 pages.

Pan, R., et al, "PIE: A Lightweight Control Scheme to Address the Bufferbloat Problem," Internet Draft, Aug. 10, 2015, 24 pages.

Orange, "Outbound Session spacing," 3GPP TSG SA WG2 Meeting #71, TD S2-091401, Feb. 16-20, 2009, Budapest, Hungary, 3 pages.

Ramakrishnan, K., "The Addition of Explicit Congestion Notification (ECN) to IP," RFC 3168, Sep. 2001, 63 pages.

* cited by examiner

METHOD AND APPARATUS FOR DETERMINING PACKET DEQUEUE RATE

CROSS-REFERENCE TO RELATED APPLICATIONS

This application is a continuation of International Patent Application No. PCT/CN2019/097035 filed on Jul. 22, 2019, which claims priority to Chinese Patent Application No. 201810903782.8 filed on Aug. 9, 2018. The disclosures of the aforementioned application are hereby incorporated by reference in their entireties.

TECHNICAL FIELD

Embodiments of this application relate to the field of communications technologies, and in particular, to a method and an apparatus for determining a packet dequeue rate.

BACKGROUND

A network device includes a cache. The cache may maintain a plurality of packet queues. After receiving a plurality of packets with a same feature, the network device may enqueue the plurality of packets into one of the plurality of packet queues by storing the plurality of packets in the cache.

Before sending the plurality of packets to a remote network device, the network device needs to dequeue the plurality of packets from the packet queue. After determining a rate at which the plurality of packets is dequeued, the network device may calculate a queuing latency of a new packet based on the rate at which the plurality of packets is dequeued. Further, the network device may perform quality of service (QoS)-based processing on the new packet. The new packet may be a packet received by the network device after the plurality of packets is dequeued from the packet queue.

The network device needs to calculate lengths of the plurality of packets to determine the rate at which the plurality of packets is dequeued. In specific implementation, a problem of wasting storage resources may exist. For example, the network device stores the plurality of packets in a memory 1, and stores the calculated lengths of the plurality of packets in a memory 2. Consequently, storage resource utilization is low.

SUMMARY

To improve storage resource utilization, this application provides the following solutions.

According to a first aspect, a method for determining a packet dequeue rate is provided. The method includes allocating a plurality of consecutive blocks in a first memory to a first packet, storing the first packet and a first length in the plurality of blocks, where the first length is a length that is of a first packet queue and that is obtained when the first packet is enqueued into the first packet queue, and determining, based on a first span and the first length stored in the plurality of blocks, a first rate at which a packet in the first packet queue is dequeued, where the first span is equal to a difference between a second time and a first time, the first time is a time at which the first packet is enqueued into the first packet queue, and the second time is a time at which the first packet is dequeued from the first packet queue.

A length of the first packet is less than capacities of the plurality of consecutive blocks. Utilization of the plurality of blocks is low if the plurality of blocks is used to store only the first packet. In the foregoing technical solution, both the first packet and the length (that is, the first length) that is of the first packet queue and that is obtained when the first packet is enqueued into the first packet queue are stored in the plurality of blocks in the first memory. Another storage resource does not need to be allocated to the first length. For example, a memory other than the first memory does not need to be used to store the first length. Therefore, in the foregoing technical solution, storage resources are saved, and utilization of the first memory is improved.

In addition, the plurality of blocks is consecutive. During access to the first memory, there is a relatively small quantity of access requests required to access the consecutive blocks in the first memory, and access efficiency is high. Therefore, in the foregoing technical solution, this helps improve memory access efficiency and reduce access overheads.

In addition, in the foregoing technical solution, the first rate at which the packet is dequeued is determined based on the first length stored in the plurality of blocks. During determining of the first length, each packet that is dequeued in the first span does not need to be monitored. At least one packet is dequeued from the first packet queue in the first span. When a plurality of packets is dequeued in the first span, lengths of the packets that are dequeued in the first span do not need to be accumulated.

Therefore, according to the method for determining a packet dequeue rate provided in this solution, memory access efficiency is improved, and occupation of storage resources is reduced.

In a possible design, all of the plurality of blocks has a same capacity, and a difference between a length of the first packet and capacities of the plurality of blocks is less than the capacity of one of the plurality of blocks.

In the foregoing technical solution, the difference between the length of the first packet and the capacities of the plurality of blocks is less than the capacity of one of the plurality of blocks. The foregoing description means that each block needs to be used when the first packet is stored in the first memory. After the first packet is stored in the plurality of blocks, there is no completely idle block in the plurality of blocks. Therefore, in the foregoing technical solution, this helps further save storage resources and improve storage resource utilization.

In a possible design, the method further includes determining a queuing latency of a second packet at a third time based on the first rate, where the queuing latency is equal to a quotient of a second length and the first rate, the second length is a length of the first packet queue at the third time, and the third time is later than the second time, and processing the second packet based on the queuing latency.

In the foregoing technical solution, the queuing latency of the second packet may be determined using the first rate, and the second packet is processed using the queuing latency. The foregoing description means that the second packet is processed based on the queuing latency of the second packet. Therefore, this helps improve efficiency of processing the second packet.

In a possible design, processing the second packet based on the queuing latency includes, when the queuing latency is less than a first threshold, enqueuing the second packet into the first packet queue by storing the second packet in a second memory, where a working frequency of the second memory is higher than a working frequency of the first memory.

In the foregoing technical solution, when the queuing latency of the second packet is relatively short, the second packet is enqueued into a memory with a relatively high working frequency. The second packet stays in a high-speed memory for a relatively short time such that a resource of the high-speed memory is properly used, and a speed of processing the second packet is improved.

In a possible design, processing the second packet based on the queuing latency includes, when the queuing latency is greater than a first threshold and less than a second threshold, enqueuing the second packet into the first packet queue by storing the second packet in the first memory.

In a possible design, processing the second packet based on the queuing latency includes, when the queuing latency is greater than a second threshold, avoiding enqueuing the second packet into the first packet queue.

When the queuing latency of the second packet is relatively high, the second packet is prevented from being enqueued into the first packet queue. The relatively high queuing latency of the second packet means that network congestion occurs. In this case, network congestion may deteriorate if the second packet is enqueued into the packet queue. Therefore, avoiding enqueuing the second packet into the first packet queue helps avoid network congestion deterioration. In addition, this helps reduce occupation of storage resources by a packet with a relatively high queuing latency, to save the storage resources.

In a possible design, processing the second packet based on the queuing latency includes, when the queuing latency is greater than a third threshold, performing an Explicit Congestion Notification (ECN) marking on the second packet.

When the queuing latency of the second packet is relatively high, ECN marking is performed on the second packet. The relatively high queuing latency of the second packet means that network congestion occurs. A receiver of the second packet may indicate, based on ECN marking performed on the second packet, a sender of the second packet to reduce a packet sending rate. Therefore, this helps reduce network congestion.

In a possible design, the method further includes storing the first time in the first memory.

Determining, based on a first span and the first length stored in the plurality of blocks, a first rate at which a packet in the first packet queue is dequeued includes determining, based on the first length stored in the plurality of blocks and the first time stored in the first memory, the first rate at which the packet in the first packet queue is dequeued.

In a possible design, the method further includes determining, based on the second length and a second span, a second rate at which the packet in the first packet queue is dequeued, where the second length is a length that is of the first packet queue and that is obtained when a third packet is enqueued into the first packet queue, the second span is equal to a difference between a fifth time and a fourth time, the fourth time is a time at which the third packet is enqueued into the first packet queue, the fifth time is a time at which the third packet is dequeued from the first packet queue, and the second length is greater than 0.

The third packet and the first packet are not adjacent to each other in the first packet queue. Alternatively, the third packet and the first packet are adjacent to each other in the first packet queue.

A rate at which the packet in the first packet queue is dequeued may change with a time. Therefore, the rate at which the packet in the first packet queue is dequeued needs to be re-determined. A rate at which the packet in the first packet queue is dequeued when the first packet is dequeued can be relatively accurately estimated using a rate determined based on the length that is of the first packet queue and that is obtained when the first packet is enqueued. A rate at which the packet in the first packet queue is dequeued when the third packet is dequeued can be relatively accurately estimated using a rate determined based on the length that is of the first packet queue and that is obtained when the third packet is enqueued. When the first packet and the third packet are adjacent to each other, a time at which the first packet is dequeued is relatively close to a time at which the third packet is dequeued. Therefore, a difference between the first rate and the second rate may be relatively small. When the first packet and the third packet are not adjacent to each other, a time at which the first packet is dequeued is not close to a time at which the third packet is dequeued. Therefore, a difference between the first rate and the second rate may be relatively large.

According to a second aspect, an apparatus for determining a packet dequeue rate is provided. The apparatus includes an allocation unit, a storage unit, and a first determining unit. The allocation unit is configured to allocate a plurality of consecutive blocks in a first memory to a first packet. The storage unit is configured to store the first packet and a first length in the plurality of blocks, where the first length is a length that is of a first packet queue and that is obtained when the first packet is enqueued into the first packet queue. The first determining unit is configured to determine, based on a first span and the first length stored in the plurality of blocks, a first rate at which a packet in the first packet queue is dequeued, where the first span is equal to a difference between a second time and a first time, the first time is a time at which the first packet is enqueued into the first packet queue, and the second time is a time at which the first packet is dequeued from the first packet queue.

In a possible design, all of the plurality of blocks has a same capacity, and a difference between a length of the first packet and capacities of the plurality of blocks is less than the capacity of one of the plurality of blocks.

In a possible design, the apparatus further includes a second determining unit and a processing unit.

The second determining unit is configured to determine a queuing latency of a second packet at a third time based on the first rate, where the queuing latency is equal to a quotient of a second length and the first rate, the second length is a length of the first packet queue at the third time, and the third time is later than the second time.

The processing unit is configured to process the second packet based on the queuing latency.

In a possible design, the processing unit is configured to, when the queuing latency is less than a first threshold, enqueue the second packet into the first packet queue by storing the second packet in a second memory, where a working frequency of the second memory is higher than a working frequency of the first memory.

In a possible design, the processing unit is configured to, when the queuing latency is greater than a first threshold and less than a second threshold, enqueue the second packet into the first packet queue by storing the second packet in the first memory.

In a possible design, the processing unit is configured to, when the queuing latency is greater than a second threshold, avoid enqueuing the second packet into the first packet queue.

In a possible design, the processing unit is configured to, when the queuing latency is greater than a third threshold, perform explicit congestion notification marking on the second packet.

In a possible design, the storage unit is further configured to store the first time in the first memory. The first determining unit is configured to determine, based on the first length stored in the plurality of blocks and the first time stored in the first memory, the first rate at which the packet in the first packet queue is dequeued.

In a possible design, the apparatus further includes a third determining unit. The third determining unit is configured to determine, based on the second length and a second span, a second rate at which the packet in the first packet queue is dequeued, where the second length is a length that is of the first packet queue and that is obtained when a third packet is enqueued into the first packet queue, the second span is equal to a difference between a fifth time and a fourth time, the fourth time is a time at which the third packet is enqueued into the first packet queue, the fifth time is a time at which the third packet is dequeued from the first packet queue, and the second length is greater than 0.

The third packet and the first packet are not adjacent to each other in the first packet queue. Alternatively, the third packet and the first packet are adjacent to each other in the first packet queue.

According to a third aspect, an apparatus is provided. The apparatus may be configured to perform the method provided in any one of the first aspect or the possible designs of the first aspect. The apparatus includes a processor and a memory coupled to the processor. The memory stores a computer program. When the processor executes the computer program, the apparatus is enabled to perform the method provided in any one of the first aspect or the possible designs of the first aspect.

According to a fourth aspect, a computer readable storage medium is provided. The computer readable storage medium is configured to store a computer program. When the computer program is executed, a computer may be enabled to perform the method provided in any one of the first aspect or the possible designs of the first aspect.

In a possible design, the computer readable storage medium may be a non-volatile computer readable storage medium.

In a possible design, the computer may be a network apparatus.

In a possible design, the network apparatus may be a forwarding apparatus. The forwarding apparatus may be a router, a network switch, a firewall, or a load balancer.

According to a fifth aspect, a computer program product is provided. The computer program product includes a computer program. When the computer program is executed, a computer may be enabled to perform the method provided in any one of the first aspect or the possible designs of the first aspect.

BRIEF DESCRIPTION OF DRAWINGS

To describe the technical solutions in some of the embodiments of this application more clearly, the following briefly describes the accompanying drawings describing some of the embodiments. The accompanying drawings in the following description show some embodiments in this application. A person of ordinary skill in the art may derive other drawings from these accompanying drawings without creative efforts.

DESCRIPTION OF EMBODIMENTS

In the data communications field, a packet may arrive at a destination after being forwarded by a plurality of forwarding apparatuses. The forwarding apparatus may be a router. The router may forward an Internet Protocol (IP) packet. The forwarding apparatus may be a network switch. The network switch may forward an Ethernet frame.

Figure 1:
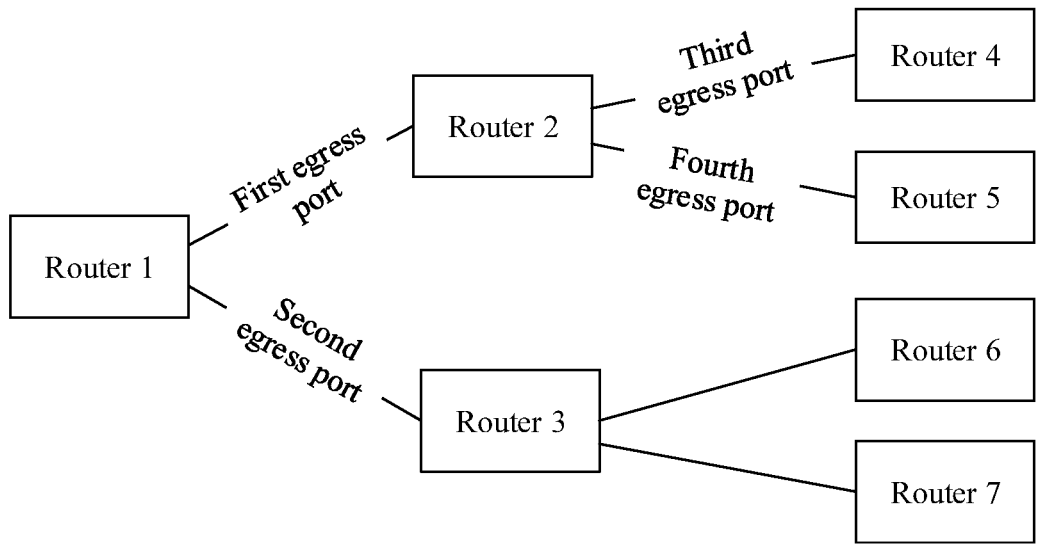
FIG. 1 is a networking structural diagram according to this application.

FIG. 1 is a networking structural diagram according to this application. Referring to FIG. 1, the networking structural diagram includes seven routers: a router 1 to a router 7. Each router may include a plurality of physical interface cards. Each physical interface card may include a plurality of ports. FIG. 1 shows two egress ports (a first egress port and a second egress port) in the router 1 and two egress ports (a third egress port and a fourth egress port) in the router 2. The router 1 is connected to the router 2 through the first egress port. The router 1 is connected to the router 3 through the second egress port. The router 2 is connected to the router 4 through the third egress port. The router 2 is connected to the router 5 through the fourth egress port.

When the router 1 receives a packet, the router 1 determines an egress port used to forward the packet, for example, the first egress port, and forwards the packet through the first egress port. When the router 2 receives the packet forwarded by the router 1, the router 2 determines an egress port used to forward the packet, for example, the third egress port, and forwards the packet through the third egress port.

Figure 2:
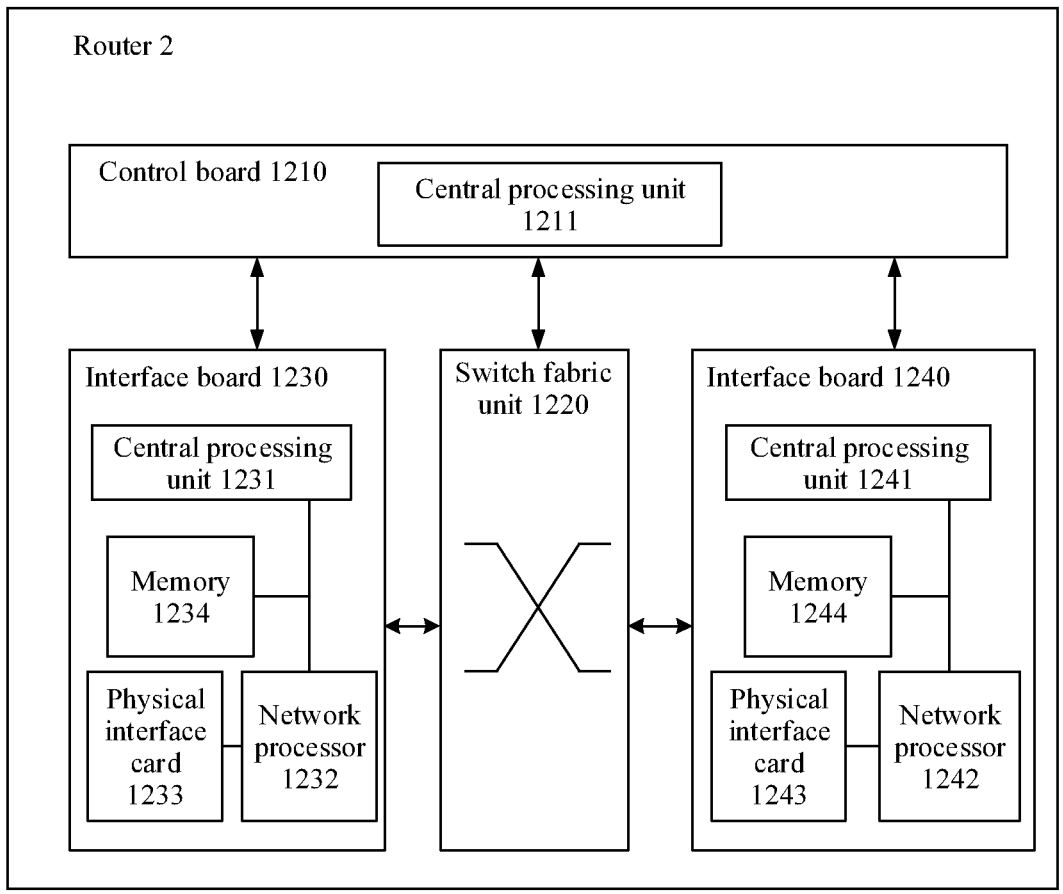
FIG. 2 is a schematic structural diagram of a router according to this application.

FIG. 2 is a possible schematic structural diagram of the router 2 in FIG. 1. Another router (for example, the router 1) in FIG. 1 may also be the schematic structural diagram shown in FIG. 2.

Referring to FIG. 2, the router 2 includes a control board 1210, a switch fabric unit 1220, an interface board 1230, and an interface board 1240. The control board 1210 includes a central processing unit 1211. The control board 1210 may be configured to perform a routing protocol. The routing protocol may be a Border Gateway Protocol (BGP) or an Interior Gateway Protocol (IGP). The control board 1210 may generate a routing table by performing the routing protocol, and send the routing table to the interface boards 1230 and 1240. It should be noted that the router 2 in FIG. 1 may also use a structure different from the structure shown in FIG. 2. For example, the router 2 in FIG. 1 may include only one control board and one interface board, but does not include a switch fabric unit. Certainly, the router 2 in FIG. 1 may include more than two interface boards. When the router 2 includes only one interface board but does not include a switch fabric unit, an IP packet received through an ingress port of the interface board may be sent from an egress port of the interface board after being processed by the interface board. When the router 2 includes a plurality of interface boards and includes a switch fabric unit, an IP packet received through an ingress port of an interface board of the router 2 may be sent from an egress port of another interface board of the router 2 after being processed by the switch fabric unit. Specific structures of the router 2 and another router in FIG. 1 are not limited in this application.

The interface board 1230 may forward an IP packet by searching the routing table. Further, the interface board 1230 includes a central processing unit 1231, a network processor 1232, a physical interface card 1233, and a memory 1234. It should be noted that FIG. 2 does not show all components that can be included in the interface board 1230. In specific implementation, the interface board 1230 may further include another component. For example, the interface board 1230 may further include a traffic manager such that the interface board 1230 has queue scheduling and management functions. In addition, the interface board 1230 may further include an ingress fabric interface chip (iFIC) such that a packet from the interface board 1230 can be switched to the interface board 1240 through the switch fabric unit 1220. For a specific implementation of the interface board 1230 including the traffic manager and the iFIC, refer to FIG. 3 and corresponding descriptions. The central processing unit 1231 may receive a routing table sent by the central processing unit 1211, and store the routing table in the memory 1234. The physical interface card 1233 may be configured to receive an IP packet sent by the router 1. The network processor 1232 may search the routing table in the memory 1234 for a routing entry that matches the IP packet received by the physical interface card 1233, and send the IP packet to the switch fabric unit 1220 based on the matched routing entry. The switch fabric unit 1220 may be configured to switch an IP packet from one interface board to another interface board. For example, the switch fabric unit 1220 may switch the IP packet from the interface board 1230 to the interface board 1240. Further, the switch fabric unit 1220 may switch the IP packet from the interface board 1230 to the interface board 1240 through cell switching. For example, the network processor 1232 may obtain a destination IP address in the IP packet. The network processor 1232 may search, based on a longest prefix matching algorithm, the routing table for the routing entry that matches the IP packet, and determine an egress port based on the routing entry that matches the IP packet. The routing entry that matches the IP packet includes an identifier of the egress port. Before the IP packet sent by the network processor 1232 to the switch fabric unit 1220 arrives at the switch fabric unit 1220, the interface board 1230 may perform queue scheduling and management on the IP packet. Further, the interface board 1230 may perform queue scheduling and management on the IP packet using a traffic manager 301 in FIG. 3.

The interface board 1240 may forward the IP packet by searching the routing table. The interface board 1240 includes a central processing unit 1241, a network processor 1242, a physical interface card 1243, and a memory 1244. FIG. 2 does not show all components that can be included in the interface board 1240. In specific implementation, the interface board 1240 may further include another component. For example, the interface board 1240 may further include a traffic manager such that the interface board 1240 has queue scheduling and management functions. In addition, the interface board 1240 may further include an egress fabric interface chip (eFIC) such that the interface board 1240 can correctly receive a packet from the interface board 1230 through the switch fabric unit 1220. For a specific implementation of the interface board 1240 including the traffic manager and the eFIC, refer to FIG. 4 and corresponding descriptions. The central processing unit 1241 may receive a routing table sent by the central processing unit 1211, and store the routing table in the memory 1244. The network processor 1242 may be configured to receive an IP packet from the switch fabric unit 1220. The IP packet from the switch fabric unit 1220 may be the IP packet that is sent by the router 1 and that is received by the physical interface card 1233. The network processor 1242 may search the routing table in the memory 1244 for a routing entry that matches the IP packet from the switch fabric unit 1220, and send the IP packet to the physical interface card 1243 based on the matched routing entry. The physical interface card 1243 may be configured to send an IP packet to the router 4. Before the IP packet sent by the network processor 1242 to the physical interface card 1243 arrives at the physical interface card 1243, the interface board 1240 may perform queue scheduling and management on the IP packet. Further, the interface board 1240 may perform queue scheduling and management on the IP packet using a traffic manager 402 in FIG. 4.

A plurality of packets needs to be transmitted in a network, and times of sending the packets may be different. The router includes a memory, to reduce disorder of the packets to be transmitted in the network. The memory may be a first in, first out memory. The router may perform queue scheduling and management on a to-be-forwarded packet using the memory. In addition, the router may receive a large quantity of packets in a short time, and a congestion degree of a first in first out queue in the memory in the router may be relatively high due to the large quantity of packets. The router may perform discard management on a packet enqueued into the first in first out queue, to reduce the congestion degree of the first in first out queue.

Figure 3:
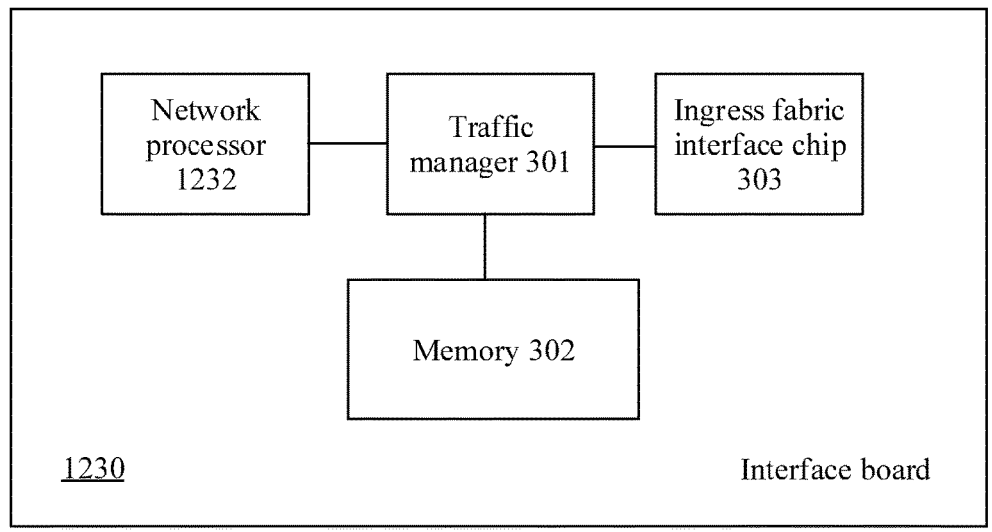
FIG. 3 is a schematic structural diagram of an interface board according to this application.

FIG. 3 is a schematic structural diagram of the interface board 1230 shown in FIG. 2 in a possible implementation. Referring to FIG. 3, the interface board 1230 includes the network processor (NP) 1232, the traffic manager (TM) 301, a memory 302, and an iFIC 303. It should be noted that FIG. 3 shows only some components included in the interface board 1230. In specific implementation, the interface board 1230 shown in FIG. 3 may further include the component in the interface board 1230 shown in FIG. 2. The interface board shown in FIG. 3 can perform queue scheduling and management on uplink traffic. The uplink traffic may be traffic that is received by the interface board 1230 through the physical interface card 1233 and that is to be sent to the switch fabric unit 1220. Further, after being processed by the network processor 1232 and the traffic manager 301, a packet received through the physical interface card 1233 is sent to the iFIC 303. After the iFIC 303 receives the packet sent by the traffic manager 301, the iFIC 303 may generate a plurality of cells based on the packet, and send the plurality of cells to the switch fabric unit 1220. The processing performed by the traffic manager 301 on the packet may include enqueue processing and dequeue processing. For example, the traffic manager 301 may perform enqueue processing on the packet by storing the packet in the memory 302. The traffic manager 301 may perform dequeue processing on the packet by deleting the packet stored in the memory 302. The memory 302 may be configured to store and maintain a packet queue. The packet queue includes a plurality of packets. The packet queue may be a first in first out queue. The memory 302 may be a first in first out memory. The traffic manager 301 can perform enqueue management on a packet that is to enter the packet queue, and perform dequeue management on a packet that is to leave the packet queue. Further, the traffic manager 301 can store and maintain a packet descriptor queue. The packet descriptor queue includes a plurality of packet descriptors. The plurality of packets included in the packet queue are in a one-to-one correspondence with the plurality of packet descriptors included in the packet descriptor queue. Each packet descriptor is used to indicate information about a corresponding packet. For example, the packet descriptor may include a storage location of the packet corresponding to the packet descriptor in the memory 302. In addition, the packet descriptor may further include a time at which the packet corresponding to the packet descriptor enters the router 2. Further, the time at which the packet corresponding to the packet descriptor enters the router 2 may be a time at which the packet corresponding to the packet descriptor is received by the physical interface card 1233. In addition, the packet descriptor may further include a length that is of the packet queue and that is obtained when the packet corresponding to the packet descriptor is enqueued into the packet queue. For example, when a packet 1 is enqueued into a packet queue 1, the packet queue 1 includes a packet 2, a packet 3, and a packet 4. The packet 2 includes 100 bits, the packet 3 includes 200 bits, and the packet 4 includes 300 bits. Therefore, when the packet 1 is enqueued into the packet queue 1, a length of the packet queue 1 is 600 bits. Accordingly, when the packet 1 is enqueued into the packet queue 1, the packet queue 1 does not include the packet 1. The traffic manager 301 can perform enqueue management on the packet from the network processor 1232. For example, the traffic manager 301 may determine, based on a weighted random early detection (WRED) algorithm, whether to discard the packet from the network processor 1232. Certainly, the traffic manager 301 may alternatively determine, based on another algorithm, whether to discard the packet from the network processor 1232. If the traffic manager 301 determines not to discard the packet from the network processor 1232, the traffic manager 301 may store the packet in the packet queue in the memory 302. Further, the traffic manager 301 may store the packet at a queue tail of the packet queue in the memory 302. In addition, the traffic manager 301 generates, based on the storage location of the packet in the memory 302, a packet descriptor corresponding to the packet, and stores the packet descriptor in a packet descriptor queue. Further, the traffic manager 301 may store the packet descriptor at a queue tail of the packet descriptor queue. The packet descriptor queue may be stored in the traffic manager 301. Further, the packet descriptor queue may be stored in a queue manager in the traffic manager. For details, refer to FIG. 6 and related descriptions in FIG. 6 in the embodiment. The traffic manager 301 can perform dequeue management on the packet queue stored in the memory 302. For example, when the traffic manager 301 determines, through weighted fair queuing (WFQ), that a packet in the packet queue stored in the memory 302 needs to be sent, the traffic manager 301 may send a scheduling signal to the memory 302 based on a queue head of the packet descriptor queue. Certainly, the traffic manager 301 may alternatively determine, based on another queue scheduling algorithm, that a packet in the packet queue stored in the memory 302 needs to be sent. The scheduling signal includes a storage location of a packet located at a queue head of the packet queue. The scheduling signal is used to indicate the memory 302 to provide the traffic manager 301 with the packet located at the queue head of the packet queue. The memory 302 provides the traffic manager 301 with the packet located at the queue head of the packet queue, and deletes the sent packet from the packet queue. The traffic manager 301 obtains, from the memory 302, the packet located at the queue head of the packet queue, and sends the packet to the iFIC 303. After the traffic manager 301 sends the packet to the iFIC 303, the traffic manager 301 deletes a packet descriptor corresponding to the sent packet from the packet descriptor queue. In the foregoing examples, the packet queue is stored in the memory 302. The memory 302 may include a plurality of blocks. The plurality of blocks may be consecutive. The plurality of blocks may have a same capacity. For example, the plurality of blocks may be a plurality of cache lines (CLs). A capacity of each cache line may be 32 bits. The traffic manager 301 may include a storage controller. The traffic manager 301 may access the memory 302 using the storage controller. For example, a length of the packet 1 is 65 bits. The length of the packet 1 is greater than capacities of two cache lines, and is less than capacities of three cache lines. When the traffic manager 301 needs to perform enqueue processing on the packet 1, the storage controller may perform a write operation on the three consecutive cache lines. The capacities of the three consecutive cache lines are 96 bits. The three consecutive cache lines may be respectively a CL 1, a CL 2, and a CL 3. The storage controller may perform a write operation on the CL 1, the CL 2, and the CL 3, to enqueue the packet 1 into the packet queue 1. It should be noted that the memory 302 may include more or fewer cache lines. For example, the memory 302 may further include a CL 4 and a CL 5. When the packet 1 is enqueued into the packet queue 1, the length of the packet queue 1 is 600 bits. 600 in decimal notation may be represented as a 10-bit binary number. A computer needs to use 10-bit storage space to store 600 in decimal notation. Further, 600 in decimal notation is 1001011000 in binary notation. The foregoing description means that when the storage controller writes the length of the packet queue 1 to the memory 302, the length of the packet queue 1 needs to occupy 10-bit storage space of the memory 302. The packet 1 occupies 65-bit storage space of the memory 302. 75-bit storage space is required to store the packet 1 and the length of the packet queue 1. The capacities of the CL 1, the CL 2, and the CL 3 are 96 bits. Therefore, the packet 1 and the length of the packet queue 1 may be stored in the CL 1, the CL 2, and the CL 3.

In a possible design, the packet queue may be stored in the traffic manager 301. Further, the traffic manager 301 may include a storage medium. The traffic manager 301 may perform enqueue processing on the packet by performing a write operation on the storage medium. The traffic manager 301 may perform dequeue processing on the packet by performing a read operation on the storage medium. For a specific implementation in which the traffic manager 301 performs enqueue processing and dequeue processing on the packet using the storage medium, refer to the foregoing description that the traffic manager 301 performs enqueue processing and dequeue processing on the packet using the memory 302. In a possible design, a working frequency of the traffic manager 301 is higher than a working frequency of the memory 302. The memory 302 may be referred to as a low-speed memory, and the storage medium included in the traffic manager 301 may be referred to as a high-speed memory. A working frequency of the high-speed memory is higher than a working frequency of the low-speed memory. In addition, the traffic manager 301 may maintain a plurality of packet queues. For example, the traffic manager 301 may maintain a high-priority queue using the storage medium, and maintain a low-priority queue using the memory 302. The working frequency of the high-speed memory is higher than the working frequency of the low-speed memory, and a span in which a packet in the high-priority queue stays in the packet queue may be shorter than a span in which a packet in the low-priority queue stays in the packet queue.

In addition to the traffic manager 301 and the memory 302, the interface board 1230 may further include another circuit having a storage function. For example, the interface board 1230 may further include the memory 1234. The memory 1234 and the memory 302 have different functions. The memory 1234 is configured to store a routing table. The network processor searches the routing table by accessing the memory 1234. The memory 302 is configured to store a first in first out queue. The traffic manager 301 manages the first in first out queue by accessing the memory 302. The memory 1234 and the memory 302 may be relatively independent memories. In a possible implementation, the memory 1234 and the memory 302 may be included in one chip.

Figure 4:
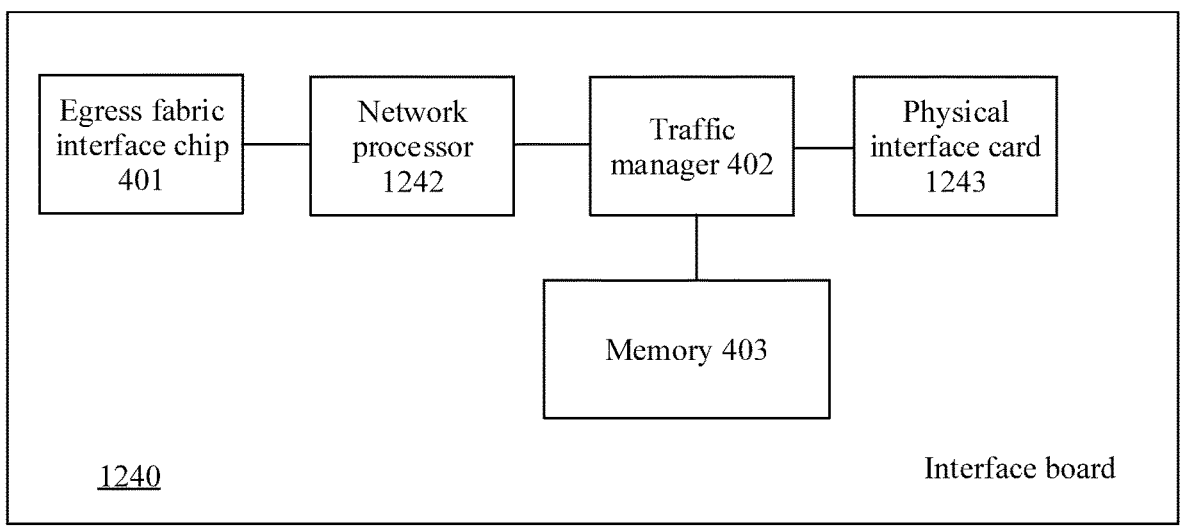
FIG. 4 is a schematic structural diagram of an interface board according to this application.

FIG. 4 is a schematic structural diagram of the interface board 1240 shown in FIG. 2 in a possible implementation. Referring to FIG. 4, the interface board 1240 includes the network processor 1242, the traffic manager 402, a memory 403, the physical interface card 1243, and an eFIC 401. It should be noted that FIG. 4 shows only some components included in the interface board 1240. In specific implementation, the interface board 1240 shown in FIG. 4 may further include the component in the interface board 1240 shown in FIG. 2. The interface board shown in FIG. 4 can perform queue scheduling and management on downlink traffic. The downlink traffic may be traffic that is received by the interface board 1240 through the switch fabric unit 1220 and that is to be sent to the physical interface card 1243. After receiving the downlink traffic, the physical interface card 1243 may send the downlink traffic to the router 4 through a third egress port. After the eFIC 401 receives the plurality of cells from the switch fabric unit 1220, the eFIC 401 can generate a packet based on the plurality of cells, and send the packet to the network processor 1242. The traffic manager 402 may perform discard management on the packet received by the network processor 1242. The traffic manager 402 may perform enqueue management on the packet received by the network processor 1242. Further, the received packet is placed in a packet queue in the memory 403 based on a scheduling algorithm, for example, placed at a queue tail of the packet queue. The traffic manager 402 may perform dequeue management on the packet queue stored in the memory 403. The packet queue may be a first in first out queue. The memory 403 may be a first in first out memory. After the traffic manager 402 obtains a packet in the packet queue stored in the memory 403, the traffic manager 402 may send the obtained packet to the physical interface card 1243. The physical interface card 1243 may send the packet to the router 4 through the third egress port. For a specific implementation in which the interface board shown in FIG. 4 performs queue scheduling and management, refer to the description in the embodiment corresponding to FIG. 3. Details are not described herein again.

Figure 5:
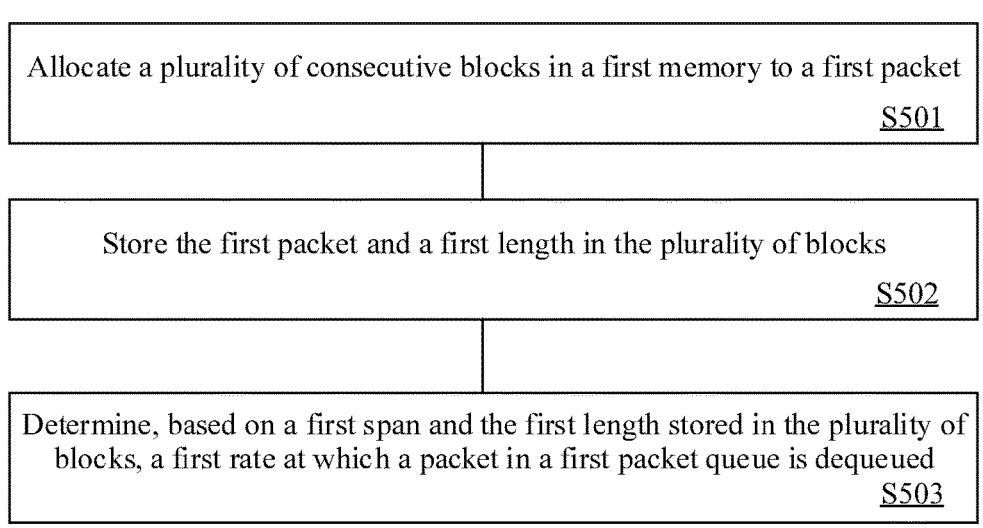
FIG. 5 is a schematic flowchart of a method for determining a packet dequeue rate according to this application.

FIG. 5 is a schematic flowchart of a method for determining a packet dequeue rate according to this application. Referring to FIG. 5, the method includes S501, S502, and S503. For example, the method shown in FIG. 5 may be performed by the interface board 1230 shown in FIG. 3. Further, the method may be performed by the traffic manager 301, to determine a packet dequeue rate. In a possible design, the traffic manager 301 may be implemented using a traffic manager 600 shown in FIG. 6. In a possible design, the method shown in FIG. 5 may be performed by the interface board 1240 shown in FIG. 4. Further, the method may be performed by the traffic manager 402. Certainly, the method shown in FIG. 5 may alternatively be performed by another software and hardware system.

Figure 6:
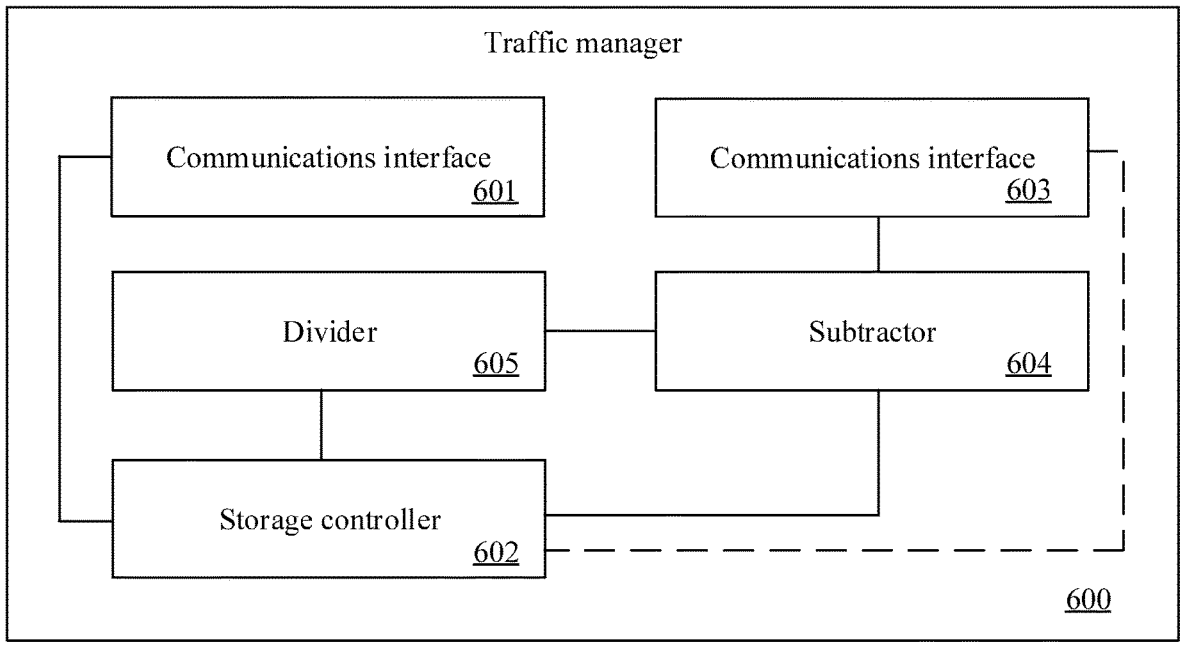
FIG. 6 is a schematic structural diagram of a traffic manager according to this application.

FIG. 6 is a schematic structural diagram of a traffic manager 600 according to this application. Referring to FIG. 6, the traffic manager 600 includes a communications interface 601, a storage controller 602, a communications interface 603, a subtractor 604, and a divider 605. The communications interface 601 is coupled to the storage controller 602. The storage controller 602 is coupled to the subtractor 604 and the divider 605. The communications interface 603 is coupled to the subtractor 604. The subtractor 604 is coupled to the divider 605. It should be noted that FIG. 6 does not show all components included in the traffic manager 600. In addition to the components shown in FIG. 6, the traffic manager 600 may further include other components. For example, the traffic manager 600 may further include a processing circuit and a storage circuit coupled to the processing circuit. The storage circuit includes a computer program. The processing circuit may perform some functions by executing the computer program in the storage circuit. In a possible design, the subtractor 604 and the divider 605 may be implemented by executing the computer program by the processing circuit.

S501: Allocate a plurality of consecutive blocks in a first memory to a first packet.

For example, all of the plurality of consecutive blocks may have a same capacity. In a possible design, at least two of the plurality of consecutive blocks may have different capacities. Referring to the foregoing embodiment, the first packet may be a packet 1. The traffic manager 301 may obtain the packet 1 through the communications interface 601. Further, the communications interface 601 obtains the packet 1 from the network processor 1232. The first memory may be the memory 302. The memory 302 may include a plurality of storage units. The plurality of storage units may include a CL 1, a CL 2, a CL 3, a CL 4, and a CL 5. The CL 1 is adjacent to the CL 2. The CL 2 is adjacent to the CL 3. The CL 3 is adjacent to the CL 4. The CL 4 is adjacent to the CL 5. The traffic manager 301 may store identifiers of the plurality of storage units. For example, the traffic manager 301 may store an address of each of the plurality of storage units. In addition, the traffic manager 301 may store a capacity of each of the plurality of storage units. Each of the plurality of storage units may be a block. The plurality of consecutive blocks may be the CL 1, the CL 2, and the CL 3. A length of the packet 1 may be 65 bits. A capacity of each of the plurality of consecutive blocks is 32 bits. The traffic manager 301 may determine, based on the length of the packet 1 and the capacity of the block in the memory 302, the plurality of consecutive blocks required to store the packet 1. Capacities of the plurality of consecutive blocks are greater than the length of the packet 1 such that the packet 1 can be stored in the plurality of consecutive blocks. When capacities of all blocks in the memory 302 are the same, the processing circuit may determine, by executing the computer program in the storage circuit, that at least three blocks are required to store the packet 1. Further, the processing circuit may allocate three consecutive storage units to the packet 1 based on the stored identifiers of the plurality of storage units. For example, the traffic manager 301 may allocate the CL 1, the CL 2, and the CL 3 to the packet 1. Certainly, the traffic manager 301 may alternatively allocate the CL 2, the CL 3, and the CL 4 to the packet 1. In a possible design, the traffic manager 301 may allocate four consecutive storage units or more storage units to the packet 1 based on the stored identifiers of the plurality of storage units. For example, the traffic manager 301 may allocate the CL 1, the CL 2, the CL 3, and the CL 4 to the packet 1. The traffic manager 301 may alternatively allocate the CL 2, the CL 3, the CL 4, and the CL 5 to the packet 1.

S502: Store the first packet and a first length in the plurality of blocks.

The first length is a length that is of a first packet queue and that is obtained when the first packet is enqueued into the first packet queue, and the first length is greater than 0.

The traffic manager 301 may maintain the length of the first packet queue. The traffic manager 301 may record a current value of the length of the first packet queue using a register. A default value of the length of the first packet queue may be 0. For example, when no packet is enqueued into the first packet queue, the traffic manager 301 may determine that the length of the first packet queue is 0. When a packet is enqueued into the first packet queue, or a packet is dequeued from the first packet queue, the traffic manager 301 correspondingly modifies the current value of the length of the first packet queue. Further, when a packet is enqueued into the first packet queue, the traffic manager 301 may update the current value of the length of the first packet queue, where an updated length of the first packet queue is equal to a sum of the length that is of the first packet queue and that is obtained before the update and a length of the enqueued packet. When the packet is dequeued from the first packet queue, the traffic manager 301 may update the current value of the length of the first packet queue, where an updated length of the first packet queue is equal to a difference between the length that is of the first packet queue and that is obtained before the update and a length of the dequeued packet.

The traffic manager 301 enqueues the first packet into the first packet queue by storing the first packet in the plurality of blocks. For example, the first packet queue may be a packet queue 1. When the packet 1 is enqueued into the packet queue 1, the packet queue 1 does not include the packet 1. For example, when the packet 1 is enqueued into the packet queue 1, the packet queue 1 includes a packet 2, a packet 3, and a packet 4. The first length may be 600 bits. The 600 bits may be represented as a 10-bit binary number. Further, 600 in decimal notation is 1001011000 in binary notation. Therefore, 10-bit storage space needs to be occupied to store the first length.

When the plurality of blocks are the CL 1, the CL 2, and the CL 3, the traffic manager 301 stores the packet 1 and the first length in the CL 1, the CL 2, and the CL 3. Further, after obtaining the packet 1 from the communications interface 601, the storage controller 602 in the traffic manager 301 may perform a write operation on the CL 1, the CL 2, and the CL 3 based on addresses of the CL 1, the CL 2, and the CL 3. It may be understood that after the packet 1 and the first length are stored in the CL 1, the CL 2, and the CL 3, the plurality of blocks further includes 21-bit idle storage space. The packet 1 and the first length may be continuously stored in the plurality of blocks. There is no idle storage space between the packet 1 and the first length. The packet 1 and the first length may alternatively be discontinuously stored in the plurality of blocks. There is idle storage space between the packet 1 and the first length.

When the plurality of blocks is the CL 1, the CL 2, the CL 3, and the CL 4, the traffic manager 301 stores the packet 1 and the first length in the CL 1, the CL 2, the CL 3, and the CL 4. It may be understood that after the packet 1 and the first length are stored in the CL 1, the CL 2, the CL 3, and the CL 4, the plurality of blocks further include 53-bit idle storage space. Further, the packet 1 may be located in the CL 1, the CL 2, and the CL 3. The first length may be located in the CL 3. Alternatively, the packet 1 may be located in the CL 1, the CL 2, and the CL 3. The first length may be located in the CL 4. Alternatively, the packet 1 may be located in the CL 2, the CL 3, and the CL 4. The first length may be located in the CL 4. Alternatively, the packet 1 may be located in the CL 2, the CL 3, and the CL 4. The first length may be located in the CL 1. In addition, the packet 1 and the first length may be continuously stored in the plurality of blocks. There is no idle storage space between the packet 1 and the first length. The packet 1 and the first length may alternatively be discontinuously stored in the plurality of blocks. There is idle storage space between the packet 1 and the first length.

S503: Determine, based on a first span and the first length stored in the plurality of blocks, a first rate at which a packet in the first packet queue is dequeued.

The first span is equal to a difference between a second time and a first time, the first time is a time at which the first packet is enqueued into the first packet queue, and the second time is a time at which the first packet is dequeued from the first packet queue.

For example, the first rate is equal to a quotient of the first length and the first span.

For example, the traffic manager 301 may be coupled to a clock circuit. For example, the traffic manager 301 may communicate with the clock circuit through the communications interface 603. The clock circuit may be included in the control board 1210. The clock circuit may include a crystal oscillator and a counter. The counter may be further an accumulator. The counter may include a memory. A value stored in the memory is equal to a current time recorded by the clock circuit. The crystal oscillator may send a square wave to the accumulator. The square wave may include a plurality of pulse signals. Further, the crystal oscillator may output a pulse signal to the counter in each working period. When the counter detects a rising edge or a falling edge of the pulse signal, the counter performs an addition operation on an increment and the value stored in the memory, to update the value stored in the memory. The increment is equal to the working period of the crystal oscillator. For example, a working frequency of the crystal oscillator may be 125 megahertz (MHz). Correspondingly, the working period of the crystal oscillator may be 8 nanoseconds (ns).

The traffic manager 301 may obtain the first time and the second time by accessing the counter in the clock circuit. Further, when the traffic manager 301 enqueues the packet 1 into the packet queue 1, the traffic manager 301 may obtain the first time by accessing the counter. The traffic manager 301 may store the first time in the memory 302. When the plurality of blocks includes idle storage space, the traffic manager 301 may store the first time in the plurality of blocks. For example, the plurality of blocks may be the CL 1, the CL 2, and the CL 3. When the CL 3 includes idle storage space, the traffic manager 301 may store the first time in the CL 3. When the traffic manager 301 dequeues the packet 1 from the packet queue 1, the traffic manager 301 may obtain the second time by accessing the counter, and obtain the first time by accessing the CL 3. Further, the traffic manager 301 determines the first span based on the obtained first time and second time. Further, the subtractor 604 obtains the first time from the plurality of blocks using the storage controller 602. The subtractor 604 obtains the second time from the counter through the communications interface 603. The subtractor 604 uses the second time as a minuend, uses the first time as a subtrahend, and calculates a difference between the minuend and the subtrahend. The difference between the minuend and the subtrahend is equal to the first span. The traffic manager 301 may determine the first rate using the divider 605. Further, the divider 605 may obtain the first span from the subtractor 604. The divider 605 obtains the first length from the plurality of blocks using the storage controller 602. The divider 605 may use the first length as a dividend, use the first span as a divisor, and calculate a quotient of the dividend and the divisor. The quotient of the dividend and the divisor is equal to the first rate.

A length of the first packet is less than capacities of the plurality of consecutive blocks. Utilization of the plurality of blocks is low if the plurality of blocks is used to store only the first packet. In the foregoing technical solution, both the first packet and the length (that is, the first length) that is of the first packet queue and that is obtained when the first packet is enqueued into the first packet queue are stored in the plurality of blocks in the first memory. Another storage resource does not need to be allocated to the first length. For example, a memory other than the first memory does not need to be used to store the first length. Therefore, in the foregoing technical solution, storage resources are saved, and utilization of the first memory is improved.

In addition, the plurality of blocks is consecutive. During access to the first memory, there is a relatively small quantity of access requests required to access the consecutive blocks in the first memory, and access efficiency is high. Therefore, in the foregoing technical solution, this helps improve memory access efficiency and reduce access overheads.

In addition, in the foregoing technical solution, the first rate at which the packet is dequeued is determined based on the first length stored in the plurality of blocks. During determining of the first length, each packet that is dequeued in the first span does not need to be monitored. When a plurality of packets is dequeued in the first span, lengths of the dequeued packets do not need to be accumulated.

Therefore, according to the method for determining a packet dequeue rate provided in this solution, memory access efficiency is improved, and occupation of storage resources is reduced.

In a possible design, all of the plurality of blocks have a same capacity, and a difference between a length of the first packet and capacities of the plurality of blocks is less than the capacity of one of the plurality of blocks.

For example, the length of the first packet is 65 bits. A capacity of each of the plurality of blocks is 32 bits. There are three blocks. Therefore, the difference between the length of the first packet and the capacities of the plurality of blocks is equal to 31 bits. The 31 bits are less than the capacity of each block.

In the foregoing technical solution, the difference between the length of the first packet and the capacities of the plurality of blocks is less than the capacity of one of the plurality of blocks. The foregoing description means that each block needs to be used when the first packet is stored in the first memory. After the first packet is stored in the plurality of blocks, there is no completely idle block in the plurality of blocks. Therefore, in the foregoing technical solution, this helps further save storage resources and improve storage resource utilization.

In a possible design, the method shown in FIG. 5 further includes determining a queuing latency of a second packet at a third time based on the first rate, where the queuing latency is equal to a quotient of a second length and the first rate, the second length is a length of the first packet queue at the third time, and the third time is later than the second time, and processing the second packet based on the queuing latency.

For example, the traffic manager 301 may receive the second packet after determining the first rate. For example, the traffic manager 301 receives the second packet through the communications interface 601. The second packet and the first packet may belong to a same packet flow (for example, a first packet flow). The first packet flow in this application is a plurality of packets with a same feature. At least one field in a packet header may be used to indicate a feature of the packet. For example, a plurality of IP packets with a same destination IP address may constitute the first packet flow. Based on the foregoing example, if destination IP addresses of two IP packets are different, the two IP packets belong to different packet flows, for example, respectively belong to the first packet flow and a second packet flow. For another example, a plurality of IP packets with a same destination IP address and a same source IP address may constitute the first packet flow. For another example, a plurality of IP packets with a same 5-tuple may constitute the first packet flow. The 5-tuple includes a source IP address, a destination IP address, a source port, a destination port, and a protocol. The source IP address, the destination IP address, and the protocol are fields in a layer 3 header (an IP header). The source port and the destination port are fields in a layer 4 header (a Transmission Control Protocol (TCP) header or a User Datagram Protocol (UDP) header). In addition, an ingress port used to receive the packet may also be used to indicate the feature of the packet. For example, if the plurality of packets is received through a same ingress port on the physical interface card 1233, the plurality of packets belongs to the first packet flow. If the plurality of packets is received through different ingress ports, the plurality of packets does not belong to a same packet flow. The packet in this application may be an IP packet or another packet. For example, the packet in this application may be an Ethernet frame.

It may be understood that the memory 302 may store and maintain only one packet queue, for example, a packet queue including the first packet flow. The memory 302 may alternatively store and maintain a plurality of packet queues at the same time, for example, a packet queue including the first packet flow and a packet queue including the second packet flow. In addition, priorities of the plurality of packet queues may be the same or different. When a priority of the packet queue including the first packet flow is higher than a priority of the packet queue including the second packet flow, a packet in the packet queue including the first packet flow is scheduled out of the memory 302 before a packet in the packet queue including the second packet flow.

The second length is the length of the first packet queue at the third time. The first packet queue does not include the second packet at the third time.

As mentioned above, the traffic manager 600 may further include the processing circuit and the storage circuit coupled to the processing circuit. The processing circuit is coupled to the divider 605. The processing circuitry may obtain the first rate from the divider 605. The storage circuit includes the computer program. The processing circuit may determine the queuing latency of the second packet by executing the computer program in the storage circuit.

The queuing latency of the second packet at the third time is used to estimate a span in which the second packet needs to stay in the first packet queue if the second packet is enqueued into the first packet queue at the third time. It should be noted that the queuing latency is not necessarily equal to a span in which the second packet actually stays in the first packet queue. The traffic manager 301 does not necessarily perform enqueue processing on the second packet. For example, the traffic manager 301 may also perform discard processing on the second packet. In addition, even if the traffic manager 301 enqueues the second packet into the first packet queue at the third time, a rate at which the packet in the first packet queue is dequeued may not remain at the first rate. For example, the traffic manager 301 may also receive a backpressure signal for the first packet queue, and the traffic manager 301 may reduce the rate at which the packet in the first packet queue is dequeued.

However, a case in which the queuing latency is determined based on the first rate to estimate the span in which the second packet stays in the first packet queue if the second packet is enqueued into the first packet queue is still meaningful for determining how to process the second packet.

The processing circuit in the traffic manager 600 may perform enqueue processing or discard processing on the second packet based on the queuing latency.

In the foregoing technical solution, the queuing latency of the second packet may be determined using the first rate, and the second packet is processed using the queuing latency. The foregoing description means that the second packet is processed based on the queuing latency of the second packet. Therefore, this helps improve efficiency of processing the second packet.

The following describes, using an example, a case in which the second packet is processed based on the queuing latency.

Example 1: When the queuing latency is less than a first threshold, the second packet is enqueued into the first packet queue by storing the second packet in a second memory, where a working frequency of the second memory is higher than a working frequency of the first memory.

For example, the first threshold is equal to 1 second, or 1 millisecond, or 1 microsecond. The first threshold may alternatively be equal to another value. A person skilled in the art may set the first threshold based on a capacity of the second memory. For example, if the capacity of the second memory is relatively large, the first threshold may be set to a relatively large value. If the capacity of the second memory is relatively small, the first threshold may be set to a relatively small value. The second memory may be the storage medium in the traffic manager 301.

In the foregoing technical solution, when the queuing latency of the second packet is relatively short, the second packet is enqueued into a memory with a relatively high working frequency. The second packet stays in a high-speed memory for a relatively short time such that a resource of the high-speed memory is properly used, and a speed of processing the second packet is improved.

Example 2: When the queuing latency is greater than a first threshold and less than a second threshold, the second packet is enqueued into the first packet queue by storing the second packet in the first memory.

For example, the first threshold is equal to 1 second, and the second threshold is equal to 2 seconds. Alternatively, the first threshold is equal to 1 millisecond, and the second threshold is equal to 2 milliseconds. Alternatively, the first threshold is equal to 1 microsecond, and the second threshold is equal to 2 microseconds. The first threshold and the second threshold each may alternatively be equal to another value. A person skilled in the art may set the first threshold and the second threshold based on capacities of the first memory and the second memory.

Example 3: When the queuing latency is greater than a second threshold, the second packet is prevented from being enqueued into the first packet queue.

For example, the second threshold is equal to 2 seconds, 2 milliseconds, or 2 microseconds. The second threshold may alternatively be equal to another value. When the queuing latency is greater than the second threshold, the traffic manager 301 may perform discard processing on the second packet. Alternatively, the traffic manager 301 may send the second packet to the control board 1210. For example, the central processing unit 1211 may process the second packet.

When the queuing latency of the second packet is relatively high, the second packet is prevented from being enqueued into the first packet queue. The relatively high queuing latency of the second packet means that network congestion occurs. In this case, network congestion may deteriorate if the second packet is enqueued into the packet queue. Therefore, avoiding enqueuing the second packet into the first packet queue helps avoid network congestion deterioration. In addition, this helps reduce occupation of storage resources by a packet with a relatively high queuing latency, to save the storage resources.

Example 4: When the queuing latency is greater than a third threshold, ECN marking is performed on the second packet.

For example, the third threshold may be equal to 3 seconds, 3 milliseconds, or 3 microseconds. The third threshold may alternatively be equal to another value. The third threshold may be greater than the second threshold, or may be less than the second threshold. The traffic manager 301 may set a field in an IP header of the second packet. For ECN marking, refer to descriptions in RFC3168 released by the Internet Engineering Task Force (IETF). Content of related parts in this document is incorporated herein by reference in its entirety. For brevity, details are not described herein.

When the queuing latency of the second packet is relatively high, ECN marking is performed on the second packet. The relatively high queuing latency of the second packet means that network congestion occurs. A receiver of the second packet may indicate, based on ECN marking performed on the second packet, a sender of the second packet to reduce a packet sending rate. Therefore, this helps reduce network congestion.

In a possible design, the method shown in FIG. 5 further includes storing the first time in the first memory.

Determining, based on a first span and the first length stored in the plurality of blocks, a first rate at which a packet in the first packet queue is dequeued includes determining, based on the first length stored in the plurality of blocks and the first time stored in the first memory, the first rate at which the packet in the first packet queue is dequeued.

In specific implementation, the storage controller 602 may obtain the first time from the clock circuit through the communications interface 603. The storage controller 602 writes the first time to the memory 302. A processor in the traffic manager 600 may determine the first span by executing a computer program. The processor calculates a quotient of the first length and the first span, to determine the first rate.

In a possible design, the method shown in FIG. 5 further includes determining, based on the second length and a second span, a second rate at which the packet in the first packet queue is dequeued, where the second length is a length that is of the first packet queue and that is obtained when a third packet is enqueued into the first packet queue, the second span is equal to a difference between a fifth time and a fourth time, the fourth time is a time at which the third packet is enqueued into the first packet queue, the fifth time is a time at which the third packet is dequeued from the first packet queue, and the second length is greater than 0.

For example, the third packet and the first packet are not adjacent to each other in the first packet queue. Alternatively, the third packet and the first packet are adjacent to each other in the first packet queue.

For example, the second rate is equal to a quotient of the second length and the second span.

A rate at which the packet in the first packet queue is dequeued may change with a time. Therefore, the rate at which the packet in the first packet queue is dequeued needs to be re-determined. A rate at which the packet in the first packet queue is dequeued when the first packet is dequeued can be relatively accurately estimated using a rate determined based on the length that is of the first packet queue and that is obtained when the first packet is enqueued. A rate at which the packet in the first packet queue is dequeued when the third packet is dequeued can be relatively accurately estimated using a rate determined based on the length that is of the first packet queue and that is obtained when the third packet is enqueued. When the first packet and the third packet are adjacent to each other, a time at which the first packet is dequeued is relatively close to a time at which the third packet is dequeued. Therefore, a difference between the first rate and the second rate may be relatively small. When the first packet and the third packet are not adjacent to each other, a time at which the first packet is dequeued is not close to a time at which the third packet is dequeued. Therefore, a difference between the first rate and the second rate may be relatively large.

Figure 7:
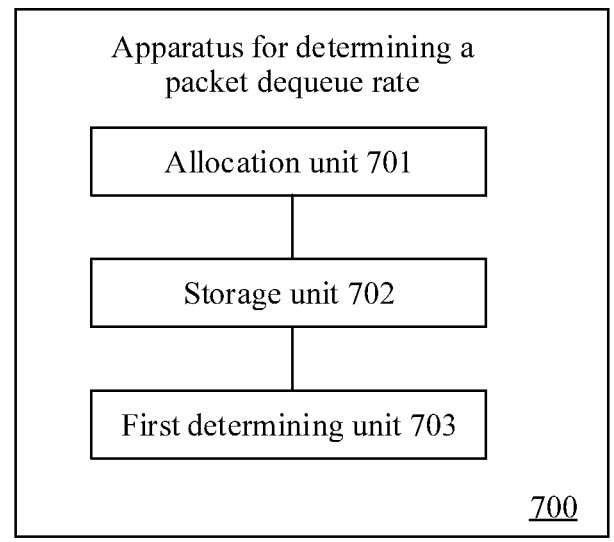
FIG. 7 is a schematic structural diagram of an apparatus for determining a packet dequeue rate according to this application.

FIG. 7 is a schematic structural diagram of an apparatus 700 for determining a packet dequeue rate according to this application. The apparatus 700 for determining a packet dequeue rate may be configured to perform S501, S502, and S503. Referring to FIG. 7, the apparatus 700 for determining a packet dequeue rate includes an allocation unit 701, a storage unit 702, and a first determining unit 703.

The allocation unit 701 is configured to allocate a plurality of consecutive blocks in a first memory to a first packet.

The storage unit 702 is configured to store the first packet and a first length in the plurality of blocks, where the first length is a length that is of a first packet queue and that is obtained when the first packet is enqueued into the first packet queue.

The first determining unit 703 is configured to determine, based on a first span and the first length stored in the plurality of blocks, a first rate at which a packet in the first packet queue is dequeued, where the first span is equal to a difference between a second time and a first time, the first time is a time at which the first packet is enqueued into the first packet queue, and the second time is a time at which the first packet is dequeued from the first packet queue.

Further, the allocation unit 701 may be configured to perform S501. The storage unit 702 may be configured to perform S502. The first determining unit 703 may be configured to perform S503. For specific implementations of the allocation unit 701, the storage unit 702, and the first determining unit 703, refer to the descriptions in the embodiment shown in FIG. 5. Details are not described herein again.

In addition, the apparatus 700 for determining a packet dequeue rate may the traffic manager 600 shown in FIG. 6. That is, the traffic manager 600 may implement a function of the apparatus 700 for determining a packet dequeue rate.

Further, the allocation unit 701 may be implemented using the processing circuit and the storage circuit in the traffic manager 600. The storage unit 702 may be implemented using the storage controller 602. The first determining unit 703 may be implemented using the communications interface 603, the storage controller 602, the subtractor 604, and the divider 605. For specific implementations of the allocation unit 701, the storage unit 702, and the first determining unit 703, refer to the descriptions in the embodiment shown in FIG. 6. Details are not described herein again.

In a possible design, all of the plurality of blocks have a same capacity, and a difference between a length of the first packet and capacities of the plurality of blocks is less than the capacity of one of the plurality of blocks.

In a possible design, the apparatus 700 further includes a second determining unit and a processing unit.

The second determining unit is configured to determine a queuing latency of a second packet at a third time based on the first rate, where the queuing latency is equal to a quotient of a second length and the first rate, the second length is a length of the first packet queue at the third time, and the third time is later than the second time. The processing unit is configured to process the second packet based on the queuing latency.

The second determining unit and the processing unit may be implemented using the processing circuit and the storage circuit in the traffic manager 600. Further, the processing circuit may implement functions of the second determining unit and the processing unit by executing a computer program in the storage circuit.

In a possible design, the processing unit is configured to, when the queuing latency is less than a first threshold, the processing unit enqueues the second packet into the first packet queue by storing the second packet in a second memory, where a working frequency of the second memory is higher than a working frequency of the first memory.

In a possible design, the processing unit is configured to, when the queuing latency is greater than a first threshold and less than a second threshold, the processing unit enqueues the second packet into the first packet queue by storing the second packet in the first memory.

In a possible design, the processing unit is configured to, when the queuing latency is greater than a second threshold, the processing unit avoids enqueuing the second packet into the first packet queue.

In a possible design, the processing unit is configured to, when the queuing latency is greater than a third threshold, the processing unit performs ECN marking on the second packet.

In the plurality of possible designs, the processing unit may be implemented using the processing circuit and the storage circuit in the traffic manager 600. Further, the processing circuit may implement a function of the processing unit by executing a computer program in the storage circuit.

In a possible design, the storage unit 702 is further configured to store the first time in the first memory. The first determining unit 703 is configured to determine, based on the first length stored in the plurality of blocks and the first time stored in the first memory, the first rate at which the packet in the first packet queue is dequeued.

In a possible design, the apparatus 700 further includes a third determining unit. The third determining unit is configured to determine, based on the second length and a second span, a second rate at which the packet in the first packet queue is dequeued, where the second length is a length that is of the first packet queue and that is obtained when a third packet is enqueued into the first packet queue, the second span is equal to a difference between a fifth time and a fourth time, the fourth time is a time at which the third packet is enqueued into the first packet queue, the fifth time is a time at which the third packet is dequeued from the first packet queue, and the second length is greater than 0.

The third packet and the first packet are not adjacent to each other in the first packet queue. Alternatively, the third packet and the first packet are adjacent to each other in the first packet queue.

The third determining unit may be implemented using the processing circuit and the storage circuit in the traffic manager 600. Further, the processing circuit may implement a function of the third determining unit by executing a computer program in the storage circuit.

Figure 8:
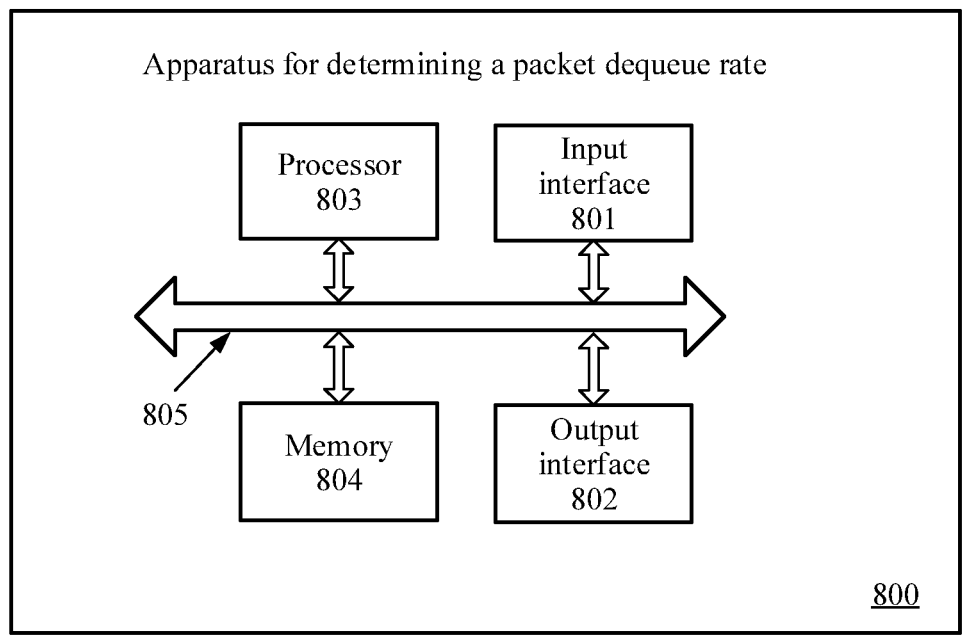
FIG. 8 is a schematic structural diagram of an apparatus for determining a packet dequeue rate according to this application.

FIG. 8 is a schematic structural diagram of an apparatus 800 for determining a packet dequeue rate according to this application. The apparatus 800 for determining a packet dequeue rate may be configured to perform the method shown in FIG. 5. Referring to FIG. 8, the apparatus 800 for determining a packet dequeue rate includes an input interface 801, an output interface 802, a processor 803, a memory 804, and a bus 805. The input interface 801, the output interface 802, the processor 803, and the memory 804 can communicate with each other through the bus 805. The input interface 801 is configured to receive a packet. The output interface 802 is configured to send a packet. The memory 804 is configured to store a computer program. The processor 803 may perform, by accessing the computer program in the memory 804, the method shown in FIG. 5. For a specific implementation in which the processor 803 performs, by accessing the computer program in the memory 804, the method shown in FIG. 5, refer to the description in the embodiment shown in FIG. 5. Details are not described herein again.

In addition, the apparatus 800 for determining a packet dequeue rate may be the traffic manager 600 shown in FIG. 6. That is, the traffic manager 600 may implement a function of the apparatus 800 for determining a packet dequeue rate. Further, the input interface 801 may be implemented using the physical interface card 1233. The output interface 802 may be implemented using the iFIC 303. The processor 803 may be implemented using a WRED circuit and a queue threshold determining circuit. For specific implementations of the input interface 801, the output interface 802, the processor 803, and the memory 804, refer to the descriptions in the embodiment shown in FIG. 6. Details are not described herein again.

This application further provides a computer readable storage medium. The computer readable storage medium is configured to store a computer program. When the computer program is executed, a computer may be enabled to perform the method shown in FIG. 5. For details, refer to the description in the embodiment shown in FIG. 5. Details are not described herein again. In a possible design, the computer readable storage medium may be a non-volatile computer readable storage medium.

This application further provides a computer program product. The computer program product includes a computer program. When the computer program is executed, a computer may be enabled to perform the method shown in FIG. 5. For details, refer to the description in the embodiment shown in FIG. 5. Details are not described herein again.

It should be understood that sequence numbers of the processes do not mean execution sequences in various embodiments of this application. The execution sequences of the processes should be determined based on functions and internal logic of the processes, and should not be construed as any limitation on the implementation processes of the embodiments of this application.

A person of ordinary skill in the art may be aware that modules and method steps in the examples described with reference to the embodiments disclosed in this specification can be implemented by electronic hardware or a combination of computer software and electronic hardware. Whether the functions are performed by hardware or a combination of computer software and electronic hardware depends on particular applications and design constraints of the technical solutions. A person skilled in the art may use different methods to implement the described functions for each particular application.

It may be clearly understood by a person skilled in the art that for the purpose of convenient and brief description, for a detailed working process of the foregoing described system, apparatus, and module, reference may be made to a corresponding process in the foregoing method embodiments. Details are not described herein again.

The software in the foregoing embodiments may be implemented in a form of a computer program product. The computer program product includes one or more computer instructions. When the computer program instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired or wireless manner. The wired manner may be a coaxial cable, an optical fiber, or a digital subscriber line (DSL). The wireless manner may be infrared, wireless, or microwave. The computer readable storage medium may be any usable medium accessible by a computer, or a data storage device, such as a server or a data center, integrating one or more usable media. The usable medium may be a magnetic medium, an optical medium, a semiconductor medium, or the like. The parts in this specification are all described in a progressive manner. For same or similar parts in the embodiments, mutual reference may be made to each other. Each embodiment focuses on a difference from other embodiments. Especially, apparatus and system embodiments are basically similar to method embodiments, and therefore are described briefly. For related parts, refer to partial descriptions in the method embodiments. The magnetic medium may be a floppy disk, a hard disk, or a magnetic tape. The optical medium may be a digital versatile disc (DVD). The semiconductor medium may be a solid-state drive (SSD). The foregoing descriptions are example implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for determining a packet dequeue rate comprising:
    allocating a plurality of blocks in a first memory to a first packet, wherein the plurality of blocks is consecutive, and wherein each of the plurality of blocks comprises a first storage capacity;
    enqueuing the first packet into a first packet queue;
    obtaining a first length of the first packet queue at a first time when the first packet is enqueued into the first packet queue;
    storing the first packet and the first length in the plurality of blocks;
    determining, based on a first span and the first length, a first rate at which a second packet in the first packet queue is dequeued, wherein the first span is equal to a first difference between a second time and the first time, wherein the second time is when the first packet is dequeued from the first packet queue, and wherein a second difference between a length of the first packet and second storage capacities of the plurality of blocks is less than the first storage capacity;
    determining a queuing latency of a third packet at a third time based on the first rate;
    enqueuing the third packet into the first packet queue by storing the third packet in a second memory when the queuing latency is less than a first threshold, wherein a second working frequency of the second memory is higher than a first working frequency of the first memory;
    enqueuing the third packet into the first packet queue by storing the third packet in the first memory when the queuing latency is greater than the first threshold and less than a second threshold;
    avoiding enqueuing the third packet into the first packet queue when the queuing latency is greater than the second threshold; and
    performing Explicit Congestion Notification (ECN) marking on the third packet when the queuing latency is greater than a third threshold.

2. The method of claim 1, wherein the queuing latency is equal to a quotient of a second length of the first packet queue at the third time and the first rate, wherein the second length is of the first packet queue at the third time that does not include the third packet, and wherein the third time is later than the second time.

3. The method of claim 1, further comprising:
    storing the first time in the first memory; and
    determining, based on the first length and the first time, the first rate.

4. The method of claim 1, further comprising:
    enqueuing a fourth packet into the first packet queue, wherein the fourth packet and the first packet are not adjacent to each other in the first packet queue;
    obtaining a third length of the first packet queue at a fourth time when the fourth packet is enqueued into the first packet queue, wherein the third length is greater than zero; and
    determining, based on the third length and a second span, a second rate at which the fourth packet is dequeued, wherein the second span is equal to a third difference between a fifth time and the fourth time, wherein the fifth time is when the fourth packet is dequeued from the first packet queue.

5. The method of claim 1, further comprising enqueuing the first packet to be not adjacent to the second packet.

6. An apparatus for determining a packet dequeue rate comprising:
    a first memory comprising a plurality of blocks, wherein the plurality of blocks is consecutive, and wherein each of the plurality of blocks comprises a first storage capacity; and
    a processor coupled to the first memory and configured to:
        allocate the plurality of blocks to a first packet;
        enqueue the first packet into a first packet queue;
        obtain a first length of the first packet queue at a first time when the first packet is enqueued into the first packet queue;
        store the first packet and the first length in the plurality of blocks;
        determine, based on a first span and the first length, a first rate at which a second packet in the first packet queue is dequeued,
        wherein the first span is equal to a first difference between a second time and the first time,
        wherein the second time is when the first packet is dequeued from the first packet queue, and
        wherein a second difference between a length of the first packet and second storage capacities of the plurality of blocks is less than the first storage capacity;
        determine a queuing latency of a third packet at a third time based on the first rate;
        enqueue the third packet into the first packet queue by storing the third packet in a second memory when the queuing latency is less than a first threshold, wherein a second working frequency of the second memory is higher than a first working frequency of the first memory;
        enqueue the third packet into the first packet queue by storing the third packet in the first memory when the queuing latency is greater than the first threshold and less than a second threshold;
        avoid enqueuing the third packet into the first packet queue when the queuing latency is greater than the second threshold; and
        perform Explicit Congestion Notification (ECN) marking on the third packet when the queuing latency is greater than a third threshold.

7. The apparatus of claim 6, wherein the queuing latency is equal to a quotient of a second length of the first packet queue at the third time and the first rate, wherein the second length is of the first packet queue at the third time that does not include the third packet, and wherein the third time is later than the second time.

8. The apparatus of claim 6, wherein the processor is further configured to:
    store the first time in the first memory; and
    determine, based on the first length and the first time, the first rate.

9. The apparatus of claim 6, wherein the processor is further configured to:
    enqueue a fourth packet into the first packet queue, wherein the fourth packet and the first packet are not adjacent to each other in the first packet queue;
    obtain a third length of the first packet queue at a fourth time when the fourth packet is enqueued into the first packet queue, wherein the third length is greater than zero; and
    determine, based on the third length and a second span, a second rate at which the fourth packet is dequeued, wherein the second span is equal to a third difference between a fifth time and the fourth time, wherein the fifth time is when the fourth packet is dequeued from the first packet queue.

10. The apparatus of claim 6, wherein the processor is further configured to enqueue the first packet to be not adjacent to the second packet.

11. A computer program product comprising computer-executable instructions stored on a non-transitory computer-readable storage medium that, when executed by a processor, cause a device to:
  allocate a plurality of blocks in a first memory to a first packet, wherein the plurality of blocks is consecutive, and wherein each of the plurality of blocks comprises a first storage capacity;
  enqueue the first packet into a first packet queue;
  obtain a first length of the first packet queue at a first time when the first packet is enqueued into the first packet queue;
  store the first packet and the first length in the plurality of blocks;
  determine, based on a first span and the first length, a first rate at which a second packet in the first packet queue is dequeued,
  wherein the first span is equal to a difference between a second time and the first time,
  wherein the second time is when the first packet is dequeued from the first packet queue, and
  wherein a second difference between a length of the first packet and second storage capacities of the plurality of blocks is less than the first storage capacity;
  determine a queuing latency of a third packet at a third time based on the first rate;
  enqueue the third packet into the first packet queue by storing the third packet in a second memory when the queuing latency is less than a first threshold, wherein a second working frequency of the second memory is higher than a first working frequency of the first memory;
  enqueue the third packet into the first packet queue by storing the third packet in the first memory when the queuing latency is greater than the first threshold and less than a second threshold;
  avoid enqueuing the third packet into the first packet queue when the queuing latency is greater than the second threshold; and
  perform Explicit Congestion Notification (ECN) marking on the third packet when the queuing latency is greater than a third threshold.

12. The computer program product of claim 11, wherein the queuing latency is equal to a quotient of a second length and the first rate, wherein the second length is of the first packet queue at the third time that does not include the third packet, and wherein the third time is later than the second time.

13. The computer program product of claim 11, wherein the instructions, when executed by the processor, further cause the device to:
  store the first time in the first memory; and
  determine, based on the first length and the first time, the first rate.

14. The computer program product of claim 11, wherein the instructions, when executed by the processor, further cause the device to:
  enqueue a fourth packet into the first packet queue, wherein the fourth packet and the first packet are not adjacent to each other in the first packet queue;
  obtain a third length of the first packet queue at a fourth time when the fourth packet is enqueued into the first packet queue, wherein the third length is greater than zero; and
  determine, based on the third length and a second span, a second rate at which the fourth packet is dequeued, wherein the second span is equal to a third difference between a fifth time and the fourth time, wherein the fifth time is when the fourth packet is dequeued from the first packet queue.

15. The computer program product of claim 11, wherein the instructions, when executed by the processor, further cause the device to enqueue the first packet to be not adjacent to the second packet.

16. A computer program product comprising computer-executable instructions stored on a non-transitory computer-readable storage medium that, when executed by a processor, cause a device to:
  allocate a plurality of blocks in a first memory to a first packet, wherein the plurality of blocks is consecutive, and wherein each of the plurality of blocks comprises a first storage capacity;
  enqueue the first packet into a first packet queue;
  obtain a first length of the first packet queue at a first time when the first packet is enqueued into the first packet queue;
  store the first packet and the first length in the plurality of blocks;
  determine, based on a first span and the first length, a first rate at which a second packet in the first packet queue is dequeued, wherein the first span is equal to a first difference between a second time and the first time, and wherein the second time is when the first packet is dequeued from the first packet queue, and wherein a second difference between a length of the first packet and second storage capacities of the plurality of blocks is less than the first storage capacity, wherein the plurality of blocks does not include an idle block and does not include an idle storage space between the first packet and the first length after the first packet and the first length are stored in the plurality of blocks;
  determine a queuing latency of a third packet at a third time based on the first rate;
  enqueue the third packet into the first packet queue by storing the third packet in a second memory when the queuing latency is less than a first threshold, wherein a second working frequency of the second memory is higher than a first working frequency of the first memory;
  enqueue the third packet into the first packet queue by storing the third packet in the first memory when the queuing latency is greater than the first threshold and less than a second threshold;
  avoid enqueuing the third packet into the first packet queue when the queuing latency is greater than the second threshold; and
  perform Explicit Congestion Notification (ECN) marking on the third packet when the queuing latency is greater than a third threshold.

17. The computer program product of claim 16, wherein the instructions, when executed by the processor, further cause the device to:
  enqueue a fourth packet into the first packet queue, wherein the fourth packet and the first packet are not adjacent to each other in the first packet queue;

obtain a third length of the first packet queue at a fourth time when the fourth packet is enqueued into the first packet queue, wherein the third length is greater than zero; and determine, based on the third length and a second span, a second rate at which the fourth packet is dequeued, wherein the second span is equal to a third difference between a fifth time and the fourth time, wherein the fifth time is when the fourth packet is dequeued from the first packet queue.

18. The computer program product of claim 16, wherein the instructions, when executed by the processor, further cause the device to:

store the first time in the first memory; and determine, based on the first length and the first time, the first rate.

19. The computer program product of claim 16, wherein the instructions, when executed by the processor, further cause the device to enqueue the first packet to be not adjacent to the second packet.

20. The computer program product of claim 16, wherein the queuing latency is equal to a quotient of a third length of the first packet queue at the third time and the first rate, wherein the third length is of the first packet queue at the third time that does not include the third packet, and wherein the third time is later than the second time.

* * * * *